United States Patent
Park et al.

(10) Patent No.: US 9,250,474 B2
(45) Date of Patent: Feb. 2, 2016

(54) DISPLAY SUBSTRATE AND DISPLAY DEVICE INCLUDING THE SAME

(71) Applicant: Samsung Display Co., Ltd., Yongin-si, Gyeonggi-do (KR)

(72) Inventors: Jae-Hyun Park, Yongin-si (KR); Seul Ki Kim, Anyang-si (KR); Seung Sok Son, Asan-si (KR); Hye Jung Lee, Bucheon-si (KR); Soon Wook Hong, Uijeongbu-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 499 days.

(21) Appl. No.: 13/803,982

(22) Filed: Mar. 14, 2013

(65) Prior Publication Data

US 2014/0036208 A1 Feb. 6, 2014

(30) Foreign Application Priority Data

Aug. 6, 2012 (KR) .................. 10-2012-0085878

(51) Int. Cl.
*G02F 1/1335* (2006.01)
*G02F 1/1337* (2006.01)
*G02F 1/1343* (2006.01)

(52) U.S. Cl.
CPC ........ *G02F 1/1337* (2013.01); *G02F 1/133514* (2013.01); *G02F 1/134309* (2013.01)

(58) Field of Classification Search
CPC ............... G02F 1/133514; G02F 1/133516; G02F 1/133512; G02F 1/133555; G02F 2201/52; G02F 1/133788; G02F 1/133753; G02F 1/133711; G02F 1/133734; G02B 5/201

USPC ................... 349/106, 108, 124, 125
See application file for complete search history.

(56) References Cited

U.S. PATENT DOCUMENTS

2007/0046881 A1* 3/2007 Takei .................... G02F 1/1323
                                                                349/139
2010/0309273 A1* 12/2010 Salvestro ................ B41J 2/465
                                                                347/188

FOREIGN PATENT DOCUMENTS

| JP | 09268029 A | 10/1997 |
|---|---|---|
| JP | 09274106 A | 10/1997 |
| JP | 09274107 A | 10/1997 |
| JP | 2004163827 A | 6/2004 |
| KR | 100508813 B1 | 8/2005 |
| KR | 100987631 B1 | 10/2010 |
| KR | 1020110038332 A | 4/2011 |
| KR | 1020130005092 A | 1/2013 |

\* cited by examiner

*Primary Examiner* — Mike Qi
(74) *Attorney, Agent, or Firm* — Cantor Colburn LLP (57) ABSTRACT

A display substrate for a display device includes: a substrate which includes a light blocking region defining a plurality of pixel areas disposed in a matrix, each pixel area having a length extending in a second direction, and a width extending in a first direction; a color filter overlapping a portion of the each pixel area of the plurality of pixel areas; and an alignment layer disposed on the color filter. the color filter includes a first edge parallel to the second direction, and a second edge forming a predetermined angle with the first edge. The second edge is substantially parallel to an alignment direction of the alignment layer.

15 Claims, 8 Drawing Sheets

DISPLAY SUBSTRATE AND DISPLAY DEVICE INCLUDING THE SAME

This application claims priority to Korean Patent Application No. 10-2012-0085878 filed on Aug. 6, 2012, and all the benefits accruing therefrom under 35 U.S.C. §119, the entire contents of which are incorporated herein by reference.

BACKGROUND (a) Field

The invention relates to a display substrate, and a display device including the same.

(b) Description of the Related Art

In general, a display device includes a display panel, and a backlight supplying light to the display panel. The display panel includes a first substrate and a second substrate facing each other, and a light amount controlling layer such as a liquid crystal layer interposed between the two substrates. The display panel transmits the light provided from the backlight thereby displaying an image.

Without the backlight as the light source, a transparent display device displaying an image by using an external light source such as natural light and fluorescent light has been developed. When using a full-cover color filter covering an entire pixel area through which light passes in the transparent display device, transmittance of the light of the transparent display device is deteriorated.

Accordingly, in the transparent display device, the transmittance of the light may be increased by using a partial-cover color filter which partially covers the pixel area.

However, when forming the color filter on a portion of the pixel area, an area of the color filter disposed in each pixel area may not be uniform such that differences may be generated in transmittance and color reproducibility of each pixel area. Also, when forming the color filter on the portion of the pixel area, the color filter may cause a step or height difference based on the color filter, and an alignment force of an alignment layer may be deteriorated at a boundary of the color filter by the step. When the alignment force is deteriorated, light leakage may be undesirably generated. By this light leakage, a contrast ratio of the display device may be deteriorated, and a quality of the display may be deteriorated.

SUMMARY

One or more exemplary embodiment of the invention provides a display device reducing or preventing display quality deterioration such as light leakage at a boundary of a color filter, by reducing a difference of alignment force of an alignment layer due to a step or height difference caused by the color filter while increasing transmittance of a transparent display device by forming the color filter on a portion of a pixel area.

An exemplary embodiment of a display substrate for a display device according to the invention includes: a substrate including a light blocking region which defines a plurality of pixel areas disposed in a matrix, each pixel area having a length extending in a first direction, and a width extending in a second direction; a color filter which overlaps a portion of the each pixel area of the plurality of pixel areas; and an alignment layer disposed on the color filter and having an alignment direction. The color filter includes a first edge parallel to the first direction, and a second edge forming a predetermined angle with the first edge. The second edge is substantially parallel to the alignment direction of the alignment layer.

The plurality of pixel areas may include a first pixel area and a second pixel area adjacent to each other in the first direction, and the color filter may overlap a portion of the first and second pixel areas.

The color filter may partially overlap the light blocking region.

A group of color filters displaying a same color among a plurality of color filters may be disposed in a line extending parallel to the first direction.

The each pixel area of the plurality of pixel areas may respectively overlap only one of a plurality of color filters.

A length of the first edge of the color filter may be smaller than the length of the each pixel area.

An exemplary embodiment of a display device according to the invention includes: a first substrate; a switching element disposed on the first substrate; a pixel electrode connected to the switching element; a second substrate facing the first substrate and including a light blocking region which defines a plurality of pixel areas disposed in a matrix, each pixel area having a length extending in a first direction, and a width extending in a second direction; a color filter disposed on the second substrate and overlapping a portion of the each pixel area of the plurality of pixel areas; and an alignment layer disposed on the color filter and having an alignment direction. The color filter includes a first edge parallel to the first direction, and a second edge forming a predetermined angle with the first edge. The second edge is substantially parallel to the alignment direction of the alignment layer.

The plurality of pixel areas may include a first pixel area and a second pixel area adjacent to each other in the first direction, and the color filter may overlap a portion of the first and second pixel areas.

One or more exemplary embodiment of the display substrate for the display device, and the display device including the display substrate according to the invention includes the color filter overlapping a portion of a pixel area, and the alignment layer disposed on the color filter. The color filter includes the edge extending in the same direction as the alignment direction of the alignment layer such that a height difference caused by the color filter is not generated in the alignment direction of the alignment layer. Thereby, the difference of the alignment force of the alignment layer due to the step caused by the color filter is reduced, and as a result, deterioration of the display quality of the display device due to light leakage is not generated at a boundary of the color filter.

BRIEF DESCRIPTION OF THE DRAWINGS

The above and other features of this disclosure will become more apparent by describing in further detail exemplary embodiments thereof with reference to the accompanying drawings in which.

DETAILED DESCRIPTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Now, exemplary embodiments of a display device substrate and a display device according to the invention will be described with reference to accompanying drawings.

Figure 1:
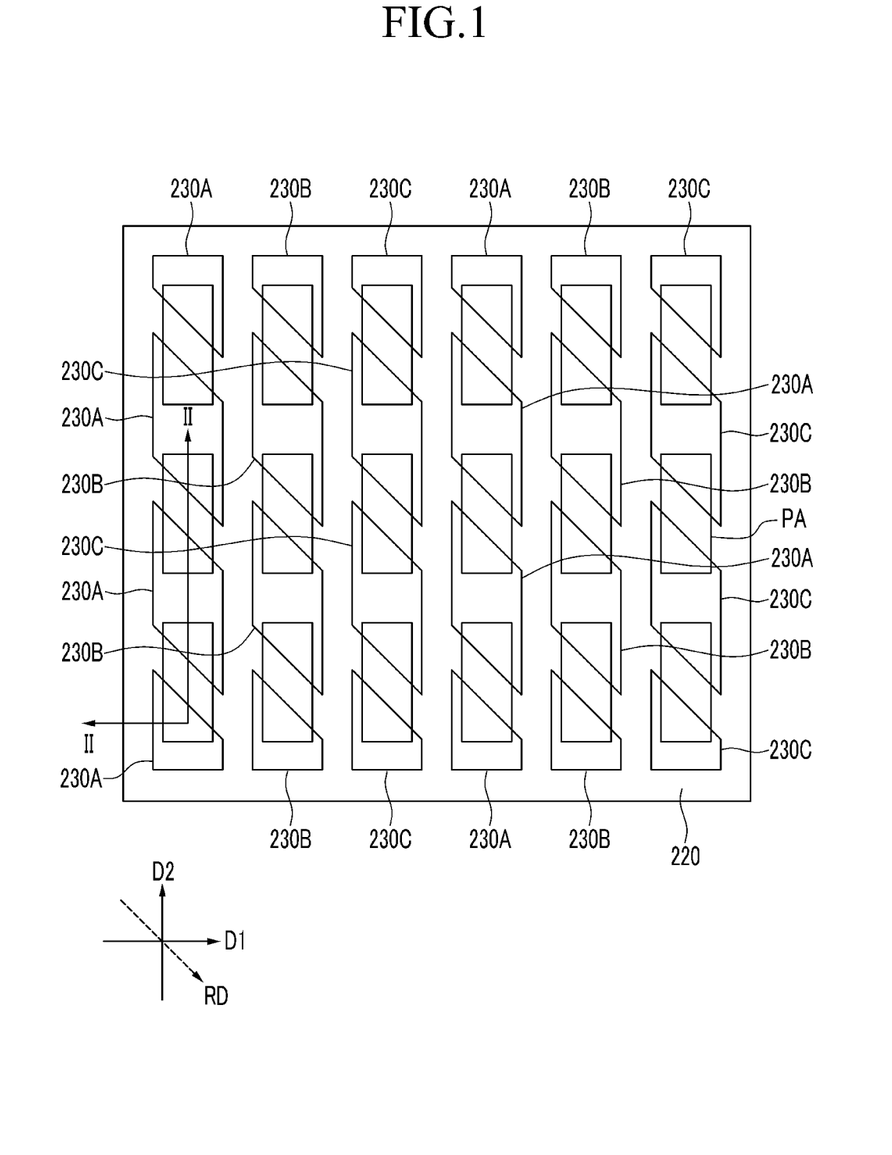
FIG. 1 is a top plan view of an exemplary embodiment of a display device according to the invention.
Figure 2:
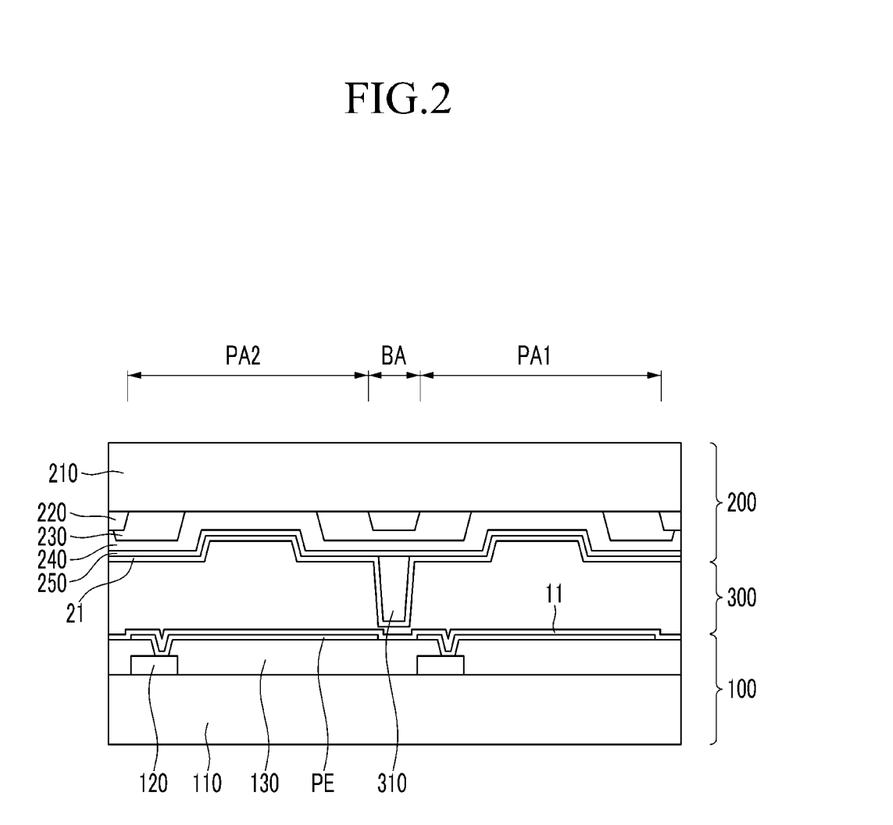
FIG. 2 is a cross-sectional view of the display device of FIG. 1 taken along line II-II.

Firstly, an exemplary embodiment of a display device substrate and a display device according to the invention will be described with reference to FIG. 1 and FIG. 2. FIG. 1 is a top plan view of an exemplary embodiment of a display device according to the invention, and FIG. 2 is a cross-sectional view of the display device of FIG. 1 taken along line II-II.

Referring to FIG. 1, the exemplary embodiment of a display device according to the invention includes a plurality of pixel areas PA, and a light blocking region BA defining the plurality of pixel area PA. A region transmitting external light including natural light or artificial light is the pixel area PA, and a region where the external light is blocked so as to not be transmitted is the light blocking region BA. A light blocking member 220 is disposed in the light blocking region BA.

Each pixel area PA has a first edge extending in the first direction D1 and a second edge extending in the second direction D2. The first direction D1 and the second direction D2 may be crossed. Each of the plurality of pixel areas PA may have a width extending in the first direction D1 and a length extending in the second direction D2. In one exemplary embodiment, for example, the length of each pixel area PA may be about three times that of the width, such as to form a rectangular shape. However, a shape and/or dimension of each pixel area PA may be changed. In one exemplary embodiment, for example, each pixel area PA may have a substantially square shape with chamfered edges.

The plurality of pixel areas PA may be separated from each other by the light blocking region BA and may be arranged in a matrix shape in the plan view.

A plurality of color filters 230A, 230B and 230C are in a portion of a region including the plurality of pixel areas PA. Each of the color filters 230A, 230B and 230C may uniquely display one of a number of primary colors, for example, three primary colors of red, green and blue, or yellow, cyan and magenta. Although not shown, the plurality of color filters may further include a color filter displaying a mixture of the primary colors or white as well as the primary colors.

In one exemplary embodiment, for example, the first color filter 230A may display a red color, the second color filter 230B may display a green color and the third color filter 230C may display a blue color.

Each of the plurality of color filters 230A, 230B and 230C may have a substantially parallelogram planar shape. In detail, each of the plurality of color filters 230A, 230B and 230C includes two first edges parallel to the second direction D2, such as parallel to the length direction of each pixel area PA, and two second edges parallel to each other and inclined to form a predetermined angle with the first edges. The second edges are substantially parallel to an alignment direction RD of a second alignment layer 21 that is described later. Each color filter 230A, 230B and 230C is disposed to overlap a portion of two neighboring pixel areas PA. A portion of the adjacent pixel areas PA is exposed by the color filters 230A, 230B and 230C.

In the exemplary embodiment shown in FIG. 1 and FIG. 2, a group or subset of the first color filters 230A may be disposed in a line according to a column direction of the pixel areas PA. A group or subset of the second color filters 230B and the third color filters 230C may be similarly disposed in a line, respectively, according to the column direction of the pixel areas PA. However, the arrangement of the first color filters 230A, the second color filters 230B and the third color filters 230C may be changed.

Next, a detailed structure of the exemplary embodiment of a display device according to the invention will be described with reference to FIG. 2 as well as FIG. 1.

Referring to FIG. 1 and FIG. 2, the exemplary embodiment of a display device according to the invention includes a first display panel 100 and a second display panel 200 facing each other, and a light amount controlling layer 300 disposed between the two display panels 100 and 200. The light amount controlling layer 300 may include a plurality of liquid crystal molecules (not shown).

The first display panel 100 includes a first insulation substrate 110, a switching element 120 disposed on the first insulation substrate 110, an insulating layer 130 disposed on the switching element 120, and a pixel electrode PE disposed on the insulating layer 130 and respectively connected to the switching element 120. Although not shown, a common electrode on the first insulation substrate 110 may be further included as well as the pixel electrode PE. The first display panel 100 may include a plurality of switching elements 120 and/or a plurality of pixel electrodes PE.

One switching element 120 and one pixel electrode PE are disposed in each pixel area PA.

The first display panel 100 may further include a first alignment layer 11 disposed on the pixel electrode PE, or on the plurality of pixel electrodes PE.

The first alignment layer 11 may be a horizontal alignment layer or a vertical alignment layer, or an alignment layer of which the vertical alignment layer and the horizontal alignment layer are sequentially deposited.

The second display panel 200 includes the light blocking member 220 on a second insulation substrate 210 and disposed in the light blocking region BA defining the pixel areas, and a color filter 230 overlapping a portion of the light blocking member 220 and the second insulation substrate 210. The second display panel 200 may include a plurality of color filters 230.

As described above, the light blocking member 220 defines a light blocking region BA which divides a plurality of pixel areas PA including a first pixel area PA1 and a second pixel area PA2 adjacent to each other.

Referring to FIG. 1 and FIG. 2, a single color filter 230 is disposed to overlap two pixel areas PA1 and PA2 and the light blocking member 220 between the two pixel areas PA1 and PA2. The color filter 230 may include the first color filter 230A displaying the first color, the second color filter 230B displaying the second color, and the third color filter 230B displaying the third color, but is not limited thereto or thereby.

Each color filter 230 may have the parallelogram shape. In detail, the color filter 230 includes two first edges parallel to the second direction D2, such as parallel to the length direction of each pixel area PA, and two second edges parallel to each other and inclined to form a predetermined angle with the first edges. The second edges are substantially parallel to an alignment direction RD of the second alignment layer 21 that is described later. The alignment direction RD is inclined with a predetermined angle with the first direction D1 and the second direction D2.

In the illustrated exemplary embodiment, each color filter 230 is disposed to overlap a portion of two adjacent pixel areas PA, but is not limited thereto or thereby. Also, a group or subset of a plurality of first color filters 230A displaying the same color is arranged in a line in the second direction D2, such as in the length direction of each pixel area PA, that is, the column direction of the pixel areas PA. Similarly, a group of a plurality of second color filters 230B and a group of a plurality of third color filters 230C displaying a same color is arranged in a line, respectively, in the second direction D2, such as in the length direction of each pixel area PA, that is, the column direction of the pixel areas PA. The plurality of color filters 230A, 230B and/or 230C may be arranged in a plurality of lines, respectively.

Accordingly, although the color filter 230 is aligned in the second direction D2 with reference to two pixel areas PA1 and PA2 adjacent in the length direction of the pixel area PA, an area of the region where the color filter 230 overlaps each pixel area PA may be substantially uniform.

Accordingly, the area of the region where the color filter 230 overlaps each pixel area PA, and the area where the color filter 230 does not overlap a pixel area PA may be uniform. That is, an exposed area of the pixel area PA and the overlapping area of the color filter 230 and the pixel area PA are substantially the same. Thereby, a change of the transmittance and the color reproducibility for each pixel area PA may be reduced or effectively prevented.

The second display panel 200 may further include an overcoat 240 disposed on the color filter 230. The overcoat 240 includes an insulating material and reduces or effectively prevents exposure of the color filter 230. In an alternative exemplary embodiment, the overcoat 240 may be omitted.

The second display panel 200 may further include a common electrode 250 on the overcoat 240. The second display panel 200 may further include a spacer 310 on the common electrode 250, and on the first display panel 100.

The second display panel 200 may further include the second alignment layer 21 on the common electrode 250. The second alignment layer 21 may be a horizontal alignment layer or a vertical alignment layer, or an alignment layer of which the vertical alignment layer and the horizontal alignment layer are sequentially deposited.

As described above, the exemplary embodiment of a display device according to the invention includes the color filter 230 overlapping the portion of the pixel area PA, and having the parallelogram shape. In detail, the color filter 230 includes two first edges parallel to the second direction D2, such as parallel to the length direction of each pixel area PA, and two second edges parallel to each other and forming the predetermined angle with the first edges. The second edges are substantially parallel to the alignment direction RD of the second alignment layer 21 which is disposed on the color filter 230. Accordingly, taken in the alignment direction RD of the second alignment layer 21 disposed on the color filter 230, a step caused by the color filter 230 does not exist.

If the step is caused by the color filter 230 in the alignment direction RD of the second alignment layer 21 which is disposed on the color filter 230, an alignment force applied by the alignment layer is deteriorated at the edge of the color filter 230 where a height of a surface of the second alignment layer 21 is increased or decreased, e.g., "stepped." Accordingly, light leakage may be generated at the edge of the color filter 230 where the alignment force of the second alignment layer 21 is deteriorated. However, in one or more exemplary embodiment of the invention, in the alignment direction RD of the second alignment layer 21 which is disposed on the color filter 230, a step is not caused by the color filter 230. Accordingly, in one or more exemplary embodiment of the display device according to the invention, an alignment defect due to the change of the alignment force of the second alignment layer 21 caused by the step of the color filter 230 may be reduced or effectively prevented, thereby reducing or effectively preventing a deterioration of the display quality based on light leakage caused by the alignment defect.

Figure 3:
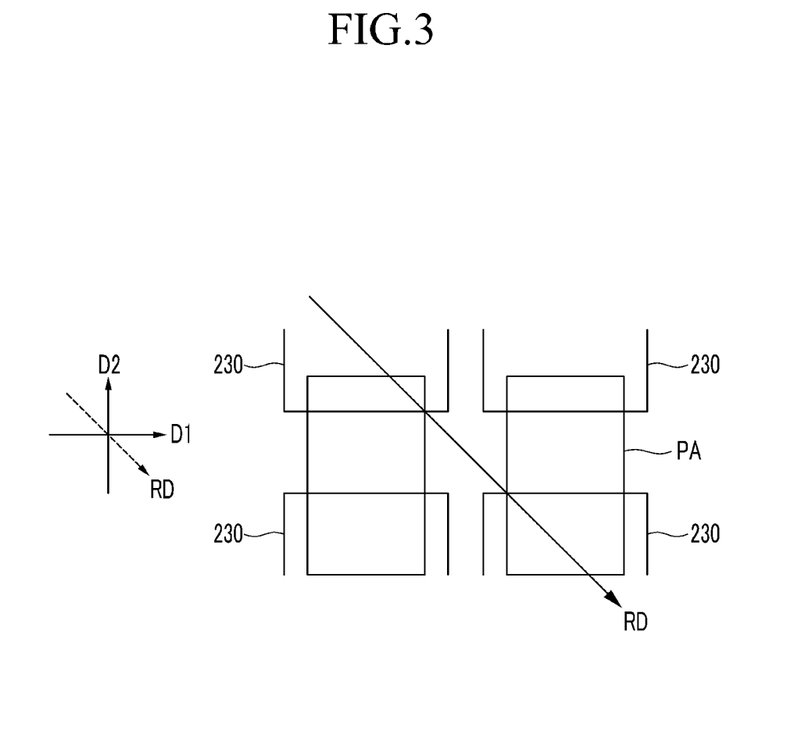
FIG. 3 and FIG. 4 are respectively a top plan and a cross-sectional view of a conventional display device to explain a step of a display device.
Figure 4:
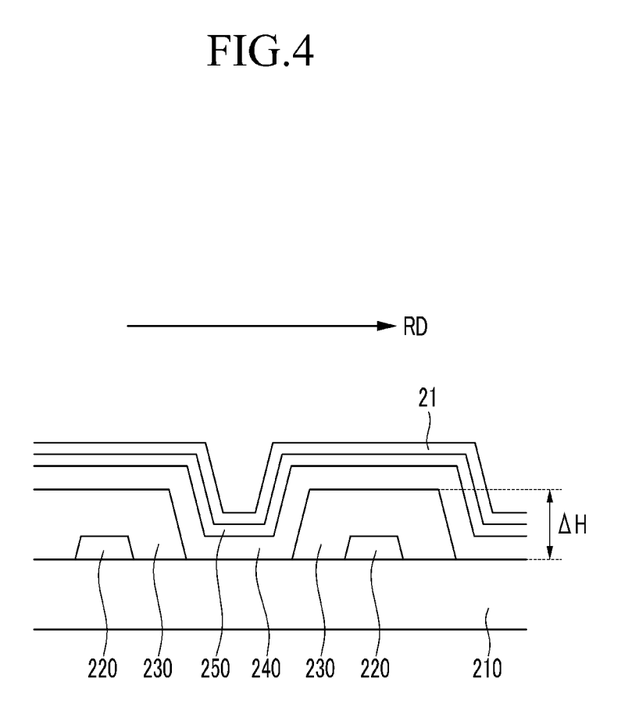

The above will be described with reference to FIG. 3 and FIG. 4. FIG. 3 and FIG. 4 are respectively a top plan and a cross-sectional view of a conventional display device to explain a step of a display device.

Referring to FIG. 3 and FIG. 4, in a conventional display device, the color filter 230 has a substantially rectangular planar shape including two edges parallel to each other and extending in the first direction D1, and two edges parallel to each other and extending in the second direction D2.

Accordingly, as shown in the cross-sectional view of FIG. 4, in the alignment direction RD of the second alignment layer 21, an upper surface of the second substrate 210 and an upper surface of the second alignment layer 21 which is disposed on the light blocking member 220, the color filter 230, the overcoat 240, and the common electrode 250 sequential on the second substrate 210, has a step caused by the height difference ΔH owing to the projection of the color filter 230. Accordingly, the step is generated between the pixel area PA including the color filter 230 and the pixel area PA not including the color filter 230. According to this step, the alignment force of the second alignment layer 21 is deteriorated at the edge of the region where the color filter 230 is disposed, and the alignment of the liquid crystal molecules of the light amount controlling layer 300 is irregular. Accordingly to this alignment force of the second alignment layer 21, the display quality deterioration of the light leakage is generated at the edge of the region where each color filter 230 is disposed.

However, in the exemplary embodiment of the display device according to the invention, the second edges among the edges of each color filter 230 are substantially parallel to the alignment direction RD of the second alignment layer 21. Accordingly, in the alignment direction RD of the second alignment layer 21 which is disposed on the color filter 230, the step caused by the color filter 230 is reduced or effectively prevented. Therefore, in the exemplary embodiment the display device according to the invention, the alignment defect due to the change of the alignment force of the second alignment layer 21 caused by the step of the color filter 230 may be reduced or effectively prevented, thereby reducing or effectively preventing deterioration of the display quality based on the light leakage caused by the alignment defect.

Also, in the exemplary embodiment of the display device according to the invention, each color filter 230 overlaps a portion of the pixel area PA, and each color filter 230 is disposed to overlap the portion of two adjacent pixel areas PA. Also, a group of a plurality of first color filters 230A displaying the same color is arranged in a line according to the second direction D2, such as in the length direction of each pixel area PA, that is, the column direction of the pixel areas PA. Similarly, a plurality of second color filters 230B and a plurality of third color filters 230C are arranged in a line, respectively, according to the second direction D2, such as in the length direction of each pixel area PA, that is, the column direction of the pixel areas PA. Therefore, although the color filter 230 is aligned in the second direction D2 with reference to two pixel areas PA1 and PA2 adjacent in the length direction of the pixel area PA, an area of the region where the color filter 230 overlaps each pixel area PA may be uniform. Accordingly, the area of the region where the color filter 230 overlaps each pixel area PA, and the area where the color filter 230 does not overlap the pixel area may be uniform. That is, an exposed area of the pixel area PA and the overlapping area of the color filter 230 and the pixel area PA are substantially the same. Thereby, the change of the transmittance and the color reproducibility for each pixel area PA may be reduced or effectively prevented.

Figure 5:
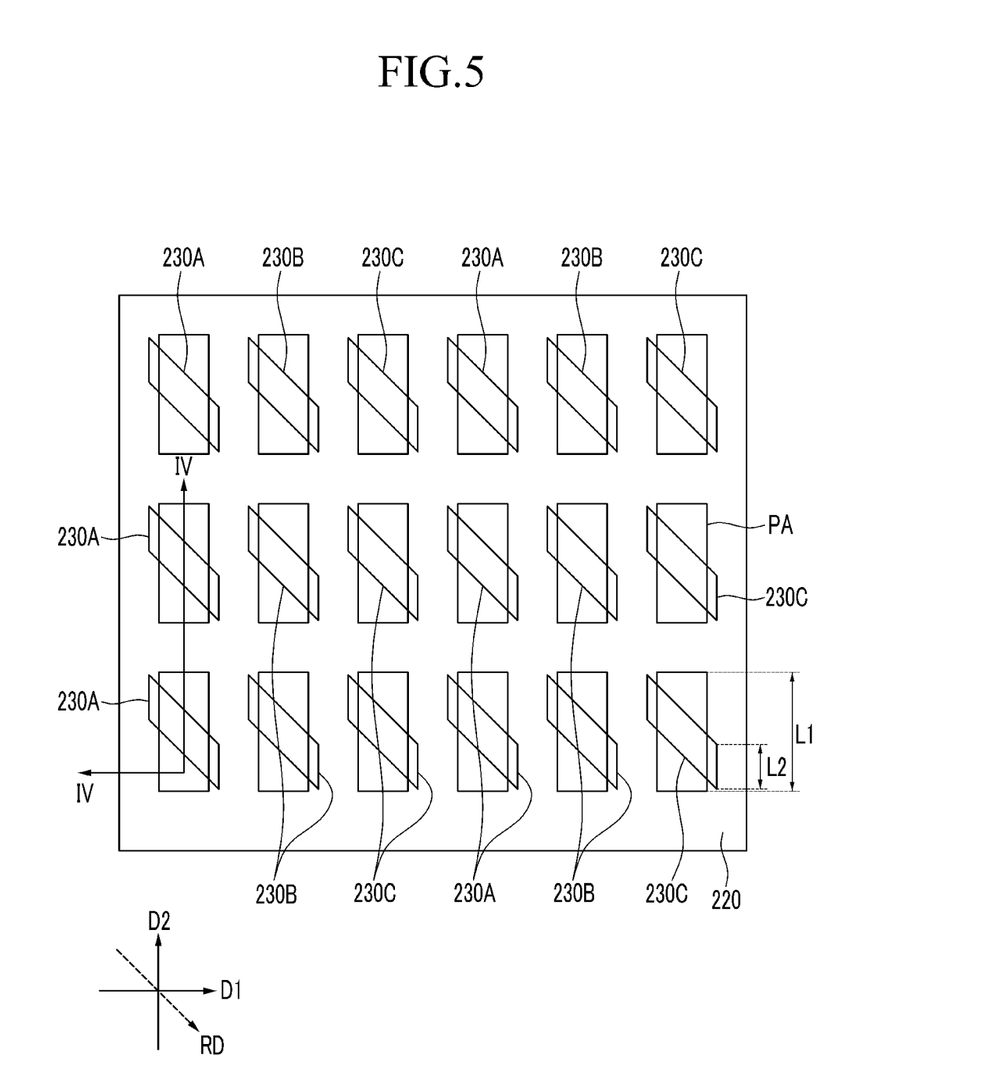
FIG. 5 is a top plan view of another exemplary embodiment of a display device according to the invention.

Next, another exemplary embodiment of a display device according to the invention will be described with reference to FIG. 5 and FIG. 6. FIG. 5 is a top plan view of another exemplary embodiment of a display device according to the invention, and FIG. 6 is a cross-sectional view of the display device of FIG. 5 taken along the line IV-IV.

Figure 6:
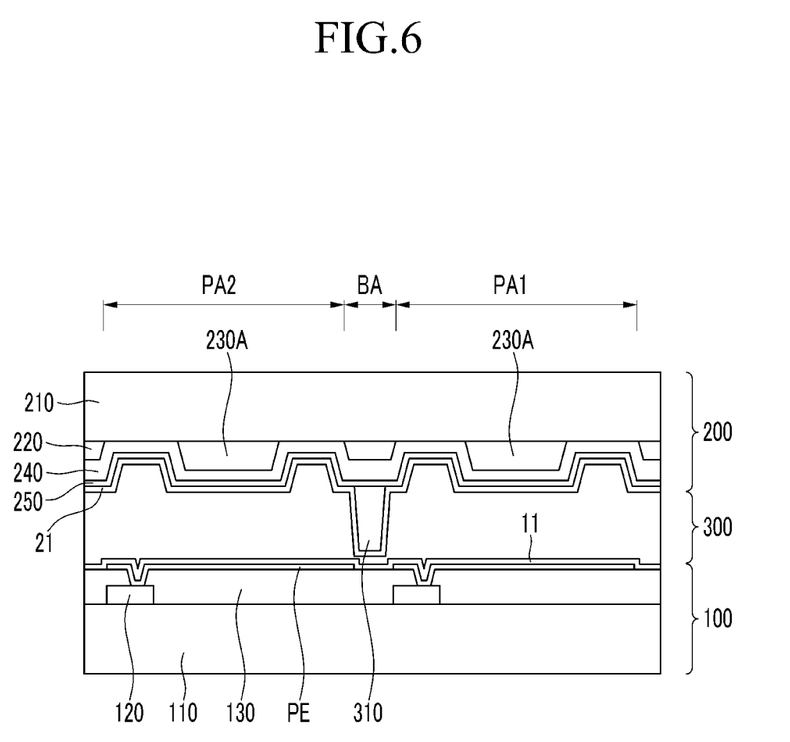
FIG. 6 is a cross-sectional view of the display device of FIG. 5 taken along line IV-IV.

Referring to FIG. 5 and FIG. 6, the exemplary embodiment of the display device according to the invention is similar to the exemplary embodiment of the display device according to the invention shown in FIG. 1 and FIG. 2. The description of the same constituent elements is omitted for convenience.

Referring to FIG. 5 and FIG. 6, the display device includes a plurality of pixel areas PA, and a light blocking region BA defining the plurality of pixel areas PA. A light blocking member 220 is disposed in the light blocking region BA. Each pixel area PA has a first edge extending in the first direction D1 and a second edge extending in the first direction D2. The first direction D1 and the second direction D2 may be crossed. Each of the plurality of pixel areas PA may have a width extending in the first direction D1 and a length extending in the second direction D2.

The plurality of pixel areas PA are separated from each other by the light blocking region BA, and is arranged in a matrix shape in the plan view.

A plurality of color filters 230 including the first color filter 230A, the second color filter 230B and the third color filter 230C are disposed in a portion of a region including the plurality of pixel areas PA.

Each of the plurality of color filters 230 may have the parallelogram shape. In detail, each of the plurality of color filters 230 includes two first edges parallel to the second direction D2, such as parallel to the length direction of each pixel area PA, and two second edges parallel to each other and forming a predetermined angle with the first edges. The second edges are substantially parallel to an alignment direction RD of a second alignment layer 21 that is described later.

However, in the exemplary embodiment of the display device shown in FIG. 5 and FIG. 6, different from the exemplary embodiment of the display device shown in FIG. 1 and FIG. 2, each color filter 230 is disposed to respectively overlap a portion of only one pixel area PA.

A first length L1 of the edge of each pixel area PA taken parallel to the second direction D2 is longer than the second length L2 of two first edges among the edges of each color filter 230 taken parallel to the second direction D2. Accordingly, although a plurality of color filters 230 is aligned in the second direction D2, such as in the length direction of the pixel area PA, the area of the region where the color filter 230 overlaps each pixel area PA may be substantially uniform. Accordingly, the area of the region where the color filter 230 overlaps each pixel area PA, and the area where the color filter 230 does not overlap the pixel area may be uniform. That is, an exposed area of the pixel area PA and the overlapping area of the color filter 230 and the pixel area PA are substantially the same. Thereby, a change of the transmittance and the color reproducibility for each pixel area PA may be reduced or effectively prevented.

As described above, the exemplary embodiment of a display device according to the invention includes the color filter 230 overlapping the portion of the pixel area PA, and having the parallelogram shape. In detail, the color filter 230 includes two first edges parallel to the second direction D2, such as parallel to the length direction of each pixel area PA, and two second edges parallel to each other and forming the predetermined angle with the first edges. The second edges are substantially parallel to the alignment direction RD of the second alignment layer 21 which is disposed on the color filter 230. Accordingly, taken in the alignment direction RD of the second alignment layer 21 which is disposed on the color filter 230, a step caused by the color filter 230 does not exist.

If the step is caused by the color filter 230 in the alignment direction RD of the second alignment layer 21 which is disposed on the color filter 230, an alignment force applied by the alignment layer is deteriorated at the edge of the color filter 230 where a height of a surface of the second alignment layer 21 is increased or decreased, e.g., "stepped." Accordingly, the light leakage may be generated at the edge of the color filter 230 where the alignment force of the second alignment layer 21 is deteriorated. However, in one or more exemplary embodiment of the invention, in the alignment direction RD of the second alignment layer 21 which is disposed on the color filter 230, a step is not caused by the color filter 230. Accordingly, in one or more exemplary embodiment of the display device according to the invention, an alignment defect due to the change of the alignment force of the second alignment layer 21 caused by the step of the color filter 230 may be reduced or effectively prevented, thereby reducing or effectively preventing a deterioration of the display quality based on light caused by the alignment defect.

Figure 7:
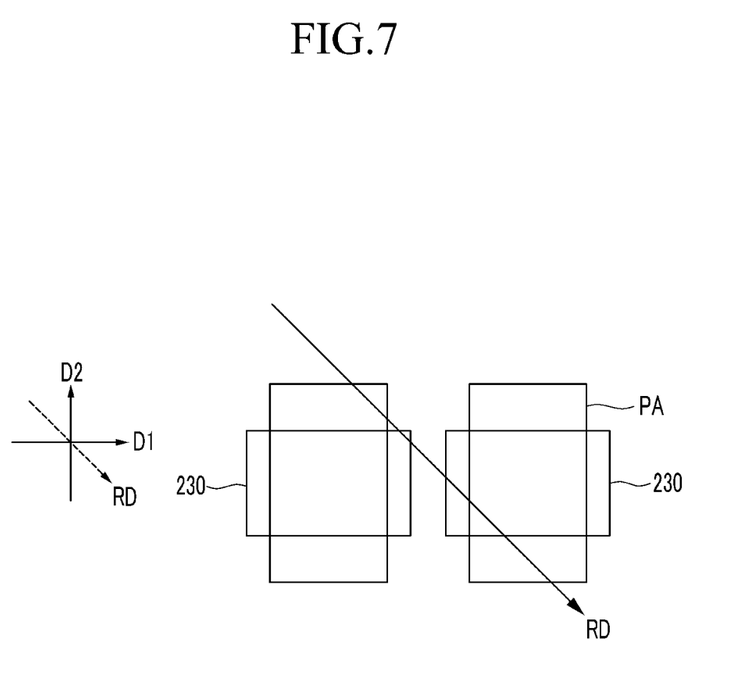
FIG. 7 and FIG. 8 are respectively a top plan and a cross-sectional view of another conventional display device to explain a step of a display device.
Figure 8:
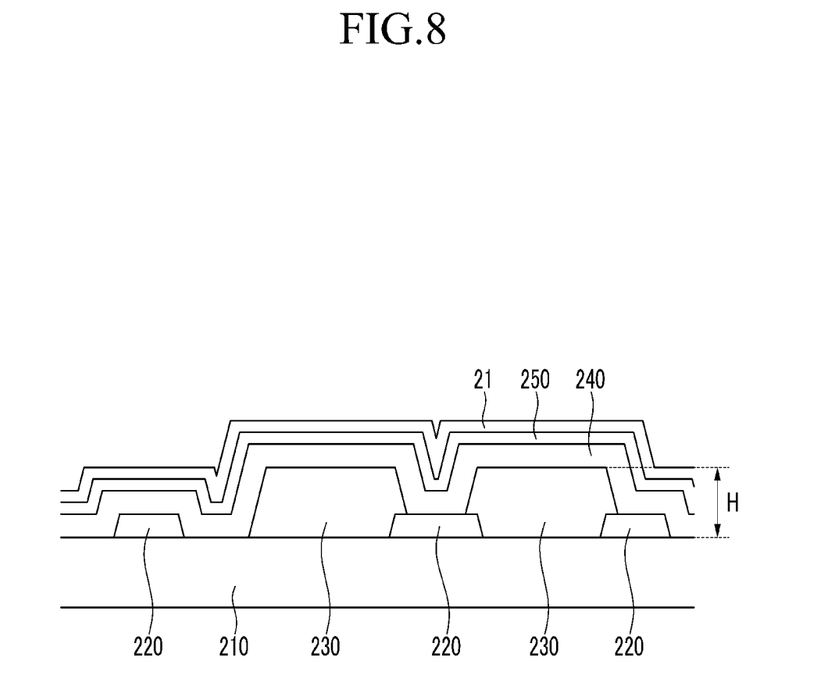

The above will be described with reference to FIG. 7 and FIG. 8. FIG. 7 and FIG. 8 are respectively a top plan and a cross-sectional view of another conventional display device to explain a step of a display device.

Referring to FIG. 7 and FIG. 8, in a conventional display device, the color filter 230 has a substantially rectangular shape including two edges parallel to each other and extending in the first direction D1, and two edges parallel to each other and extending in the second direction D2.

Accordingly, as shown in the cross-sectional view of FIG. 8, in the alignment direction RD of the second alignment layer 21, an upper surface of the second substrate 210, and an upper surface of the second alignment layer 21 which is disposed on the light blocking member 220, the color filter 230, the overcoat 240, and the common electrode 250 sequential on the second substrate 210, has a step caused by the height difference ΔH owing to the projection of the color filter 230. Accordingly, the step is generated between the pixel area including the color filter 230 and the pixel area not including the color filter 230. According to this step, the alignment force of the second alignment layer 21 is deteriorated at the edge of the region where the color filter 230 is disposed, and the alignment of the liquid crystal molecules of the light amount controlling layer 300 is irregular. Accordingly to this alignment force of the second alignment layer 21, the display quality deterioration of the light leakage is generated at the edge of the region where each color filter 230 is disposed.

However, in the exemplary embodiment of the display device according to the invention, the second edges among the edges of each color filter 230 are substantially parallel to the alignment direction RD of the second alignment layer 21. Accordingly, in the alignment direction RD of the second alignment layer 21 which is disposed on the color filter 230, the step caused by the color filter 230 is reduced or effectively prevented. Therefore, in the exemplary embodiment of the display device according to the invention, the alignment defect due to the change of the alignment force of the second alignment layer 21 caused by the step of the color filter 230 may be reduced or effectively prevented, thereby reducing or effectively preventing deterioration of the display quality deterioration based on the light leakage caused by the alignment defect.

Any or all characteristics of the exemplary embodiment of the display device with reference to FIG. 1 and FIG. 2 may be applied to the exemplary embodiment of the display device in FIG. 5 and FIG. 6.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display substrate comprising:
 a substrate comprising a light blocking region which defines a matrix of a plurality of pixel areas, each pixel area having a length extending in a second direction, and a width extending in a first direction different from the first direction;
 a color filter overlapping a portion of the each pixel area of the plurality of pixel areas; and
 an alignment layer on the color filter and having an alignment direction,
 wherein
 the color filter comprises a first edge parallel to the second direction, and a second edge inclined at a predetermined angle to the first edge, and
 the second edge is substantially parallel to the alignment direction of the alignment layer.

2. The display substrate of claim 1, wherein
 the plurality of pixel areas comprises a first pixel area and a second pixel area adjacent to each other in the first direction, and
 the color filter overlaps a portion of the first and second pixel areas, and exposes a portion of the first and second pixel areas.

3. The display substrate of claim 2, wherein the color filter overlaps the light blocking region.

4. The display substrate of claim 2, further comprising a plurality of color filters,
 wherein a group of color filters which displays a same color among the plurality of color filters is in a line extending parallel to the second direction.

5. The display substrate of claim 1, further comprising a plurality of color filters,
 wherein the each pixel area respectively overlaps only one of the plurality of color filters.

6. The display substrate of claim 5, wherein
 a length of the first edge of the color filter in the second direction is smaller than the length of the each pixel area.

7. A display device comprising:
 a first substrate;
 a switching element on the first substrate;
 a pixel electrode connected to the switching element;
 a second substrate facing the first substrate, and comprising a light blocking region which defines a matrix of a plurality of pixel areas, each pixel area having a length extending in a second direction, and a width extending in a first direction different from the first direction;

a color filter on the second substrate and overlapping a portion of the each pixel area of the plurality of pixel areas; and an alignment layer on the color filter and having an alignment direction, wherein the color filter comprises a first edge parallel to the second direction, and a second edge inclined at a predetermined angle to the first edge, and the second edge is substantially parallel to the alignment direction of the alignment layer.

8. The display device of claim 7, wherein the plurality of pixel areas comprises a first pixel area and a second pixel area adjacent to each other in the first direction, and the color filter overlaps a portion of the first and second pixel areas, and exposes a portion of the first and second pixel areas.

9. The display device of claim 8, wherein the color filter overlaps the light blocking region.

10. The display device of claim 8, further comprising a plurality of color filters, wherein a group of color filters which displays a same color among the plurality of color filters is in a line extending parallel to the second direction.

11. The display device of claim 8, further comprising a light amount controlling layer between the first substrate and the second substrate, wherein the light amount controlling layer comprises a plurality of liquid crystal molecules.

12. The display device of claim 7, further comprising a plurality of color filters, wherein the each pixel area overlaps only one of the plurality of color filters.

13. The display device of claim 12, wherein a length of the first edge of the color filter in the second direction, is smaller than the length of the each pixel area.

14. The display device of claim 12, further comprising a light amount controlling layer between the first substrate and the second substrate, and the light amount controlling layer comprises a plurality of liquid crystal molecules.

15. The display device of claim 7, further comprising a light amount controlling layer between the first substrate and the second substrate, and the light amount controlling layer comprises a plurality of liquid crystal molecules.

* * * * *